(12) United States Patent
Dema et al.

(10) Patent No.: US 7,985,344 B2
(45) Date of Patent: Jul. 26, 2011

(54) HIGH STRENGTH, HIGH CAPACITY FILTER MEDIA AND STRUCTURE

(75) Inventors: Keh B. Dema, Maple Grove, MN (US); Linda M. Olson, Savage, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 11/986,377

(22) Filed: Nov. 20, 2007

(65) Prior Publication Data

US 2008/0073296 A1    Mar. 27, 2008

Related U.S. Application Data

(62) Division of application No. 10/982,538, filed on Nov. 5, 2004.

(51) Int. Cl.
*B01D 37/00* (2006.01)
(52) U.S. Cl. ........ 210/767; 210/504; 210/505; 210/508; 210/509
(58) Field of Classification Search .................. 210/767, 210/504, 505, 506, 508, 509
See application file for complete search history.

(56) References Cited

U.S. PATENT DOCUMENTS

| | | | |
|---|---|---|---|
| 2,764,602 A | 9/1956 | Ahlbrecht |
| 2,764,603 A | 9/1956 | Ahlbrecht |
| 2,801,706 A | 8/1957 | Asker |
| 2,803,656 A | 8/1957 | Ahlbrecht |
| 3,073,735 A | 1/1963 | Till et al. |
| 3,147,064 A | 9/1964 | Brown |
| 3,255,131 A | 6/1966 | Ahlbrecht |
| 3,279,151 A | 10/1966 | Kauer, Jr. et al. |
| 3,303,621 A | 2/1967 | Hill |
| 3,450,755 A | 6/1969 | Ahlbrecht |
| 3,505,794 A | 4/1970 | Nutter et al. |
| 3,589,956 A | 6/1971 | Kranz et al. |
| 3,595,731 A | 7/1971 | Davies et al. |
| 3,616,160 A | 10/1971 | Wincklhofer |
| 3,616,183 A | 10/1971 | Brayford et al. |
| 3,620,819 A | 11/1971 | Croce |
| 3,639,195 A | 2/1972 | Sanders |
| 3,653,181 A | 4/1972 | Becker |
| 3,705,480 A | 12/1972 | Wireman |
| 3,714,763 A | 2/1973 | Suzuki |
| 3,728,848 A | 4/1973 | Vest |
| 3,744,256 A | 7/1973 | Cobb et al. |
| 3,891,417 A | 6/1975 | Wade |
| 3,917,448 A | 11/1975 | Wood |
| 3,934,238 A | 1/1976 | Pavlov |
| 3,937,860 A | 2/1976 | Gusman et al. |
| 3,972,694 A | 8/1976 | Head |
| 3,998,988 A | 12/1976 | Shimomai et al. |
| 4,042,522 A | 8/1977 | Falk |
| 4,045,350 A | 8/1977 | Kupf et al. |
| 4,047,914 A | 9/1977 | Hansen et al. |
| 4,069,158 A | 1/1978 | Bertocchio et al. |
| 4,069,244 A | 1/1978 | Mueller |
| 4,079,675 A | 3/1978 | Beumel |
| 4,088,726 A | 5/1978 | Cumbers |
| 4,090,967 A | 5/1978 | Falk |
| 4,102,785 A | 7/1978 | Head et al. |
| 4,111,815 A | 9/1978 | Walker et al. |
| 4,160,059 A | 7/1979 | Samejima |
| 4,161,422 A | 7/1979 | Lawson et al. |
| 4,161,590 A | 7/1979 | Mueller |
| 4,161,602 A | 7/1979 | Mueller |
| 4,169,754 A | 10/1979 | Perrotta |
| 4,177,141 A | 12/1979 | Nakamura et al. |
| 4,189,338 A | 2/1980 | Ejima et al. |
| 4,210,540 A | 7/1980 | Perrotta |
| 4,211,819 A | 7/1980 | Kunimune et al. |
| 4,231,768 A | 11/1980 | Seibert et al. |
| 4,234,655 A | 11/1980 | Kunimune et al. |
| 4,239,278 A | 12/1980 | Skilliter |
| 4,239,516 A | 12/1980 | Klein |
| 4,254,731 A | 3/1981 | Taylor |
| 4,267,016 A | 5/1981 | Okazaki et al. |
| 4,269,888 A | 5/1981 | Ejima et al. |
| 4,272,318 A | 6/1981 | Walker et al. |
| 4,274,914 A | 6/1981 | Keith et al. |
| 4,309,475 A | 1/1982 | Hoffman, Jr. |
| 4,318,774 A | 3/1982 | Powell et al. |
| 4,321,108 A | 3/1982 | Goddard et al. |
| 4,327,936 A | 5/1982 | Sekiguchi |
| 4,370,152 A | 1/1983 | Luper |
| 4,388,086 A | 6/1983 | Bauer |
| 4,423,995 A | 1/1984 | Karis |
| 4,429,001 A | 1/1984 | Kolpin et al. |
| 4,443,233 A | 4/1984 | Moran |
| 4,457,974 A | 7/1984 | Summers |
| 4,487,617 A | 12/1984 | Dienes et al. |
| 4,500,384 A | 2/1985 | Tomioka et al. |
| 4,501,598 A | 2/1985 | Long |
| RE31,849 E | 3/1985 | Klein |

(Continued)

FOREIGN PATENT DOCUMENTS

DE    43 44 819 A1    7/1994

(Continued)

OTHER PUBLICATIONS

"Filter Bag," *Nonwovens Industry*, vol. 23, No. 3, pp. 5 and 68 (Mar. 1992).

(Continued)

*Primary Examiner* — Robert A Clemente
(74) *Attorney, Agent, or Firm* — Pauly, DeVries Smith & Deffner, L.L.C.

(57) ABSTRACT

In the filtration of fluid materials, the removal of particulate from the moving stream requires substantial pressure to maintain flow and substantial capacity for removing particulate. The filters of the invention are rugged, high wet strength materials having a basis weight, permeability and efficiency suitable to obtain substantial reduction in particulate loading from liquid streams without plugging or mechanical failure. In particular, the filters of the invention permit the removal of substantial proportions of particulate from non-aqueous streams including lubricant oils, hydraulic fluids and other contaminated streams.

7 Claims, 7 Drawing Sheets

U.S. PATENT DOCUMENTS

| | | | |
|---|---|---|---|
| 4,504,289 A | 3/1985 | Walker |
| 4,536,440 A | 8/1985 | Berg |
| 4,545,789 A | 10/1985 | Lato |
| 4,548,624 A | 10/1985 | Walker |
| 4,551,378 A | 11/1985 | Carey, Jr. |
| 4,552,603 A | 11/1985 | Harris, Jr. et al. |
| 4,555,430 A | 11/1985 | Mays |
| 4,579,774 A | 4/1986 | Kuwazuru et al. |
| 4,597,218 A | 7/1986 | Friemel et al. |
| 4,604,205 A | 8/1986 | Ayers |
| 4,610,678 A | 9/1986 | Weisman et al. |
| 4,627,863 A | 12/1986 | Klein |
| 4,657,804 A | 4/1987 | Mays et al. |
| 4,659,467 A | 4/1987 | Spearman |
| 4,661,132 A | 4/1987 | Thornton et al. |
| 4,676,807 A | 6/1987 | Miller |
| 4,677,929 A | 7/1987 | Harris |
| 4,681,801 A | 7/1987 | Eian et al. |
| 4,684,576 A | 8/1987 | Tabor et al. |
| 4,688,511 A | 8/1987 | Gerlach et al. |
| 4,689,057 A | 8/1987 | Gasper |
| 4,713,285 A | 12/1987 | Klein |
| 4,726,817 A | 2/1988 | Roger |
| 4,729,371 A | 3/1988 | Krueger et al. |
| 4,732,809 A | 3/1988 | Harris, Jr. et al. |
| 4,734,208 A | 3/1988 | Pall et al. |
| 4,764,189 A | 8/1988 | Yanagawa et al. |
| 4,765,812 A | 8/1988 | Homonoff et al. |
| 4,765,915 A | 8/1988 | Diehl |
| 4,807,619 A | 2/1989 | Dyrud et al. |
| 4,814,033 A | 3/1989 | Spearman et al. |
| 4,816,224 A | 3/1989 | Vogel et al. |
| 4,838,903 A | 6/1989 | Thomaides et al. |
| 4,838,905 A | 6/1989 | Billiet et al. |
| 4,840,838 A | 6/1989 | Wyss |
| 4,868,032 A | 9/1989 | Eian et al. |
| 4,874,666 A | 10/1989 | Kubo et al. |
| 4,886,058 A | 12/1989 | Brostrom et al. |
| 4,889,764 A | 12/1989 | Chenoweth et al. |
| 4,904,385 A | 2/1990 | Wessling et al. |
| 4,911,789 A | 3/1990 | Rieunier et al. |
| 4,917,714 A * | 4/1990 | Kinsley, Jr. ................. 55/524 |
| 4,919,753 A | 4/1990 | Johnson et al. |
| 4,933,129 A | 6/1990 | Huykman |
| 4,983,434 A | 1/1991 | Sassa |
| 5,022,964 A | 6/1991 | Crane et al. |
| 5,027,781 A | 7/1991 | Lewis |
| 5,034,040 A | 7/1991 | Walcott |
| 5,042,468 A | 8/1991 | Lambert |
| 5,045,210 A | 9/1991 | Chen et al. |
| 5,057,368 A | 10/1991 | Largman et al. |
| 5,066,538 A | 11/1991 | Huykman |
| 5,068,141 A | 11/1991 | Kubo et al. |
| 5,080,791 A | 1/1992 | Sims |
| 5,082,476 A | 1/1992 | Kahlbaugh et al. |
| 5,087,278 A | 2/1992 | Suzuki |
| 5,089,119 A | 2/1992 | Day et al. |
| 5,092,911 A | 3/1992 | Williams |
| 5,104,537 A | 4/1992 | Stifelman et al. |
| 5,108,827 A | 4/1992 | Gessner |
| 5,110,330 A | 5/1992 | Loughron |
| 5,131,387 A | 7/1992 | French et al. |
| 5,147,553 A | 9/1992 | Waite |
| 5,147,721 A | 9/1992 | Baron et al. |
| 5,167,764 A | 12/1992 | Nielsen et al. |
| 5,167,765 A | 12/1992 | Nielsen et al. |
| 5,190,569 A | 3/1993 | McGrath |
| 5,190,812 A | 3/1993 | Joseph et al. |
| 5,208,098 A | 5/1993 | Stover |
| 5,212,131 A | 5/1993 | Belding |
| 5,246,474 A | 9/1993 | Greatorex |
| 5,246,772 A | 9/1993 | Manning |
| 5,275,743 A | 1/1994 | Miller et al. |
| 5,283,106 A | 2/1994 | Seller et al. |
| 5,284,704 A | 2/1994 | Kochesky et al. |
| 5,302,443 A | 4/1994 | Manning et al. |
| 5,307,796 A | 5/1994 | Kronzer et al. |
| 5,334,446 A | 8/1994 | Quantrille et al. |
| 5,336,286 A | 8/1994 | Alexander et al. |
| 5,354,603 A | 10/1994 | Errede et al. |
| 5,364,456 A | 11/1994 | Kahlbaugh et al. |
| 5,366,631 A | 11/1994 | Adiletta |
| 5,380,580 A | 1/1995 | Rogers et al. |
| 5,405,682 A | 4/1995 | Shawyer et al. |
| 5,415,676 A | 5/1995 | Tokar et al. |
| 5,436,980 A | 7/1995 | Weeks et al. |
| 5,454,945 A | 10/1995 | Spearman |
| 5,458,960 A | 10/1995 | Nieminen et al. |
| 5,468,572 A | 11/1995 | Zguris et al. |
| 5,472,467 A | 12/1995 | Pfeffer |
| 5,486,410 A | 1/1996 | Groeger et al. |
| 5,508,079 A | 4/1996 | Grant et al. |
| 5,508,093 A | 4/1996 | Mehdorn |
| 5,509,340 A | 4/1996 | Kawamura |
| 5,545,453 A | 8/1996 | Grant |
| 5,545,475 A | 8/1996 | Korleski |
| 5,575,832 A | 11/1996 | Boyd |
| 5,580,459 A | 12/1996 | Powers et al. |
| 5,581,647 A | 12/1996 | Onishi et al. |
| 5,584,784 A | 12/1996 | Wu |
| 5,597,645 A | 1/1997 | Pike et al. |
| 5,605,746 A | 2/1997 | Groeger et al. |
| 5,607,735 A | 3/1997 | Brown |
| 5,616,408 A | 4/1997 | Oleszczuk et al. |
| 5,620,641 A | 4/1997 | Berger |
| 5,620,785 A | 4/1997 | Watt et al. |
| 5,633,082 A | 5/1997 | Berger |
| 5,643,467 A | 7/1997 | Romanco |
| 5,643,653 A | 7/1997 | Griesbach et al. |
| 5,645,057 A | 7/1997 | Watt et al. |
| 5,645,689 A | 7/1997 | Ruf et al. |
| 5,645,690 A | 7/1997 | Cox, Jr. |
| 5,662,728 A | 9/1997 | Groeger |
| 5,665,235 A | 9/1997 | Gildersleeve et al. |
| 5,667,562 A | 9/1997 | Midkiff |
| 5,672,399 A | 9/1997 | Kahlbaugh et al. |
| 5,672,415 A | 9/1997 | Sawyer et al. |
| 5,677,058 A | 10/1997 | Neal et al. |
| 5,679,042 A | 10/1997 | Varona |
| 5,705,119 A | 1/1998 | Takeuchi et al. |
| 5,709,735 A | 1/1998 | Midkiff et al. |
| 5,711,878 A | 1/1998 | Ogata et al. |
| 5,721,180 A | 2/1998 | Pike et al. |
| 5,728,187 A | 3/1998 | Kern et al. |
| 5,728,298 A | 3/1998 | Hamlin |
| 5,753,002 A | 5/1998 | Glucksman |
| 5,755,963 A | 5/1998 | Sugiura et al. |
| 5,779,847 A | 7/1998 | Groeger |
| 5,783,505 A | 7/1998 | Duckett |
| 5,785,725 A | 7/1998 | Cusick et al. |
| 5,792,711 A | 8/1998 | Roberts |
| 5,795,835 A | 8/1998 | Bruner et al. |
| 5,800,586 A | 9/1998 | Cusick et al. |
| 5,800,884 A | 9/1998 | D'Anna et al. |
| 5,804,286 A | 9/1998 | Quantrille et al. |
| 5,820,646 A | 10/1998 | Gillingham et al. |
| 5,837,627 A | 11/1998 | Halabisky et al. |
| 5,840,245 A * | 11/1998 | Coombs et al. .................. 422/4 |
| 5,853,439 A | 12/1998 | Gieseke et al. |
| 5,885,390 A | 3/1999 | Alkire et al. |
| 5,911,213 A | 6/1999 | Ahlborn et al. |
| 5,932,104 A | 8/1999 | Kawamura |
| 5,935,879 A | 8/1999 | Helwig et al. |
| 5,935,883 A | 8/1999 | Pike |
| 5,948,344 A | 9/1999 | Cusick et al. |
| 5,952,252 A | 9/1999 | Shawver et al. |
| 5,954,962 A | 9/1999 | Adiletta |
| 5,965,468 A | 10/1999 | Marmon et al. |
| 5,972,166 A | 10/1999 | Helwig et al. |
| 5,972,477 A | 10/1999 | Kim et al. |
| 5,976,998 A | 11/1999 | Sandor et al. |
| 5,981,410 A | 11/1999 | Hansen et al. |
| 5,989,432 A | 11/1999 | Gildersleeve et al. |
| 5,989,688 A | 11/1999 | Barge et al. |
| 5,993,501 A | 11/1999 | Cusick et al. |
| 5,993,943 A | 11/1999 | Bodaghi et al. |
| 6,007,608 A | 12/1999 | Johnson |

| Patent No. | Date | Inventor |
|---|---|---|
| 6,007,898 A | 12/1999 | Kim et al. |
| 6,013,587 A | 1/2000 | Truong et al. |
| 6,024,782 A | 2/2000 | Freund et al. |
| 6,041,782 A | 3/2000 | Angadjivand et al. |
| 6,045,597 A | 4/2000 | Choi |
| 6,071,419 A | 6/2000 | Beier et al. |
| 6,071,641 A | 6/2000 | Zguris et al. |
| 6,077,391 A | 6/2000 | Girondi |
| 6,099,726 A | 8/2000 | Gembolis et al. |
| 6,103,181 A | 8/2000 | Berger |
| 6,103,643 A | 8/2000 | Forsten |
| 6,110,249 A | 8/2000 | Medcalf et al. |
| 6,136,058 A | 10/2000 | Miller |
| 6,139,595 A | 10/2000 | Herman et al. |
| 6,143,049 A | 11/2000 | Gieseke et al. |
| 6,143,441 A | 11/2000 | Zguris |
| 6,146,436 A | 11/2000 | Hollingsworth et al. |
| 6,152,120 A | 11/2000 | Julazadeh |
| 6,156,682 A | 12/2000 | Fletemier et al. |
| 6,156,842 A | 12/2000 | Hoenig et al. |
| 6,165,572 A | 12/2000 | Kahlbaugh et al. |
| 6,169,045 B1 | 1/2001 | Pike et al. |
| 6,171,355 B1 | 1/2001 | Gieseke et al. |
| 6,171,369 B1 | 1/2001 | Schultink et al. |
| 6,171,684 B1 | 1/2001 | Kahlbaugh et al. |
| 6,174,603 B1 | 1/2001 | Berger |
| 6,183,536 B1 | 2/2001 | Schultink et al. |
| 6,186,992 B1 | 2/2001 | Roe et al. |
| 6,187,073 B1 | 2/2001 | Gieseke et al. |
| 6,190,768 B1 | 2/2001 | Turley et al. |
| 6,197,709 B1 | 3/2001 | Tsai et al. |
| 6,200,669 B1 | 3/2001 | Marmon et al. |
| 6,203,713 B1 | 3/2001 | Tanny |
| 6,241,886 B1 | 6/2001 | Kitagawa et al. |
| 6,251,224 B1 | 6/2001 | Dong |
| 6,264,044 B1 | 7/2001 | Meyering et al. |
| 6,267,252 B1 | 7/2001 | Amsler |
| 6,267,843 B1 | 7/2001 | Helwig et al. |
| 6,290,739 B1 | 9/2001 | Gieseke et al. |
| 6,300,261 B1 | 10/2001 | Young et al. |
| 6,301,887 B1 | 10/2001 | Gorel et al. |
| 6,306,539 B1 | 10/2001 | Zguris |
| 6,316,107 B1 | 11/2001 | Lubnin et al. |
| 6,330,883 B1 | 12/2001 | Berger |
| 6,351,078 B1 | 2/2002 | Wang et al. |
| 6,352,947 B1 | 3/2002 | Haley et al. |
| 6,355,076 B2 | 3/2002 | Gieseke et al. |
| 6,355,079 B1 | 3/2002 | Sorvari et al. |
| 6,364,976 B2 | 4/2002 | Fletemier et al. |
| 6,365,001 B1 | 4/2002 | Helwig et al. |
| 6,372,004 B1 | 4/2002 | Schultink et al. |
| 6,384,369 B1 | 5/2002 | Stenersen et al. |
| 6,406,789 B1 | 6/2002 | McDaniel et al. |
| 6,409,785 B1 | 6/2002 | Smithies et al. |
| 6,409,787 B1 | 6/2002 | Smithies et al. |
| 6,419,721 B1 | 7/2002 | Hunter |
| 6,419,839 B1 | 7/2002 | Cox et al. |
| 6,420,626 B1 | 7/2002 | Erspamer et al. |
| 6,428,610 B1 | 8/2002 | Tsai et al. |
| 6,440,192 B2 | 8/2002 | Guerin et al. |
| 6,458,456 B1 | 10/2002 | Zainiev et al. |
| 6,479,147 B2 | 11/2002 | Lubnin et al. |
| 6,488,811 B1 | 12/2002 | Dong |
| 6,495,286 B2 | 12/2002 | Zguris et al. |
| 6,503,447 B1 | 1/2003 | Mondjian et al. |
| 6,511,774 B1 | 1/2003 | Tsukuda et al. |
| 6,517,612 B1 | 2/2003 | Crouch et al. |
| 6,521,321 B2 | 2/2003 | Kahlbaugh et al. |
| 6,528,439 B1 | 3/2003 | Stokes et al. |
| 6,530,366 B2 | 3/2003 | Geiger et al. |
| 6,530,969 B2 | 3/2003 | Gieseke et al. |
| 6,540,801 B2 | 4/2003 | Gieseke et al. |
| 6,541,114 B2 | 4/2003 | Katou et al. |
| 6,547,860 B2 | 4/2003 | Buchwald et al. |
| 6,555,489 B1 | 4/2003 | Pfeffer |
| 6,576,034 B2 | 6/2003 | Berger |
| 6,607,997 B1 | 8/2003 | Cox et al. |
| 6,613,704 B1 | 9/2003 | Arnold et al. |
| 6,616,723 B2 | 9/2003 | Berger |
| 6,624,099 B1 | 9/2003 | Shah |
| H2086 H | 10/2003 | Amsler |
| 6,645,388 B2 | 11/2003 | Sheikh-Ali |
| 6,649,547 B1 | 11/2003 | Arnold et al. |
| 6,652,614 B2 | 11/2003 | Gieseke et al. |
| 6,653,381 B2 | 11/2003 | Thames et al. |
| 6,673,864 B2 | 1/2004 | Patel et al. |
| 6,682,576 B1 | 1/2004 | Kiyotani et al. |
| 6,682,809 B2 | 1/2004 | Van Rheenen |
| 6,695,148 B2 | 2/2004 | Homonoff et al. |
| 6,705,270 B1 | 3/2004 | Rau et al. |
| 6,706,086 B2 | 3/2004 | Emig et al. |
| 6,723,142 B2 | 4/2004 | Emerson et al. |
| 6,723,669 B1 | 4/2004 | Clark et al. |
| 6,740,142 B2 | 5/2004 | Buettner et al. |
| 6,743,273 B2 | 6/2004 | Chung et al. |
| 6,770,356 B2 | 8/2004 | O'Donnell et al. |
| 6,797,377 B1 | 9/2004 | DeLucia et al. |
| 6,815,383 B1 | 11/2004 | Arnold |
| 6,818,037 B2 | 11/2004 | Tamaka et al. |
| 6,821,321 B2 | 11/2004 | Chinn et al. |
| 6,821,672 B2 | 11/2004 | Zguris |
| 6,835,311 B2 | 12/2004 | Koslow |
| 6,848,866 B1 | 2/2005 | McGinn |
| 6,849,330 B1 | 2/2005 | Morin et al. |
| 6,858,057 B2 | 2/2005 | Healey |
| 6,860,917 B2 | 3/2005 | Henrichsen et al. |
| 6,866,692 B2 | 3/2005 | Emerson et al. |
| 6,872,431 B2 | 3/2005 | Kahlbaugh et al. |
| 6,872,674 B2 | 3/2005 | Williams et al. |
| 6,874,641 B2 | 4/2005 | Clary |
| 6,875,249 B2 | 4/2005 | Gogins |
| 6,878,191 B2 | 4/2005 | Escaffre et al. |
| 6,883,321 B2 | 4/2005 | Fornof |
| 6,916,752 B2 | 7/2005 | Berrigan et al. |
| 6,923,182 B2 | 8/2005 | Angadjivand et al. |
| 6,924,028 B2 | 8/2005 | Chung et al. |
| 6,926,961 B2 | 8/2005 | Roth |
| 6,936,554 B1 | 8/2005 | Singer et al. |
| 6,939,386 B2 | 9/2005 | Sato et al. |
| 6,939,492 B2 | 9/2005 | Jackson et al. |
| 6,942,711 B2 | 9/2005 | Faulkner et al. |
| 6,955,708 B1 | 10/2005 | Julos et al. |
| 6,955,775 B2 | 10/2005 | Chung et al. |
| 6,966,940 B2 | 11/2005 | Krisko et al. |
| 6,991,113 B2 | 1/2006 | Nakajima |
| 7,008,144 B2 | 3/2006 | McGinn |
| 7,029,516 B2 | 4/2006 | Campbell et al. |
| 7,037,569 B2 | 5/2006 | Curro et al. |
| 7,049,254 B2 | 5/2006 | Bansal et al. |
| 7,070,640 B2 | 7/2006 | Chung et al. |
| 7,090,715 B2 | 8/2006 | Chung et al. |
| 7,094,270 B2 | 8/2006 | Schultink et al. |
| 7,115,150 B2 | 10/2006 | Johnson et al. |
| 7,125,470 B2 | 10/2006 | Graef et al. |
| 7,309,372 B2 | 12/2007 | Kahlbaugh et al. |
| 7,314,497 B2 | 1/2008 | Kahlbaugh et al. |
| 7,520,994 B2 | 4/2009 | Dong et al. |
| 2001/0000375 A1* | 4/2001 | Kobayashi et al. |
| 2002/0007167 A1* | 1/2002 | Dan et al. |
| 2002/0013111 A1* | 1/2002 | Dugan et al. |
| 2002/0083690 A1 | 7/2002 | Emig et al. |
| 2002/0116910 A1 | 8/2002 | Berger |
| 2002/0121194 A1* | 9/2002 | Buchwald et al. |
| 2002/0127939 A1* | 9/2002 | Hwo et al. |
| 2002/0193030 A1* | 12/2002 | Yao et al. |
| 2003/0008214 A1* | 1/2003 | Zguris |
| 2003/0019193 A1* | 1/2003 | Chinn et al. |
| 2003/0022575 A1* | 1/2003 | Yoneda et al. |
| 2003/0039815 A1 | 2/2003 | Roth |
| 2003/0082979 A1* | 5/2003 | Bean et al. |
| 2003/0084788 A1* | 5/2003 | Fraser, Jr. |
| 2003/0087568 A1* | 5/2003 | Kinn et al. |
| 2003/0089092 A1* | 5/2003 | Bause et al. |
| 2003/0096549 A1* | 5/2003 | Ortega et al. |
| 2003/0106294 A1* | 6/2003 | Chung et al. |
| 2003/0109190 A1* | 6/2003 | Geel |
| 2003/0139110 A1* | 7/2003 | Nagaoka et al. |
| 2003/0145569 A1* | 8/2003 | Sato et al. |

| | | | |
|---|---|---|---|
| 2003/0148691 A1* | 8/2003 | Pelham et al. | |
| 2003/0150820 A1* | 8/2003 | Dussaud et al. | |
| 2003/0211799 A1* | 11/2003 | Yao et al. | |
| 2004/0116026 A1* | 6/2004 | Kubose et al. | |
| 2004/0134355 A1* | 7/2004 | Kasmark, Jr. | |
| 2004/0192141 A1* | 9/2004 | Yang et al. | |
| 2004/0221436 A1* | 11/2004 | Ortega et al. | |
| 2004/0242108 A1 | 12/2004 | Russell et al. | |
| 2004/0255783 A1* | 12/2004 | Graham et al. | 96/69 |
| 2005/0026526 A1 | 2/2005 | Verdegan et al. | |
| 2005/0109683 A1 | 5/2005 | Joyce et al. | |
| 2005/0130031 A1 | 6/2005 | Zguris | |
| 2005/0160711 A1 | 7/2005 | Yang | |
| 2005/0210844 A1 | 9/2005 | Kahlbaugh et al. | |
| 2005/0214188 A1 | 9/2005 | Rohrbach et al. | |
| 2005/0233665 A1 | 10/2005 | Groten et al. | |
| 2006/0009106 A1 | 1/2006 | Nishimura et al. | |
| 2006/0094320 A1 | 5/2006 | Chen et al. | |
| 2006/0096263 A1 | 5/2006 | Kahlbaugh et al. | |
| 2006/0096932 A1* | 5/2006 | Dema et al. | 210/767 |
| 2006/0101796 A1 | 5/2006 | Kern et al. | |
| 2006/0121811 A1 | 6/2006 | Mangold et al. | |
| 2006/0137317 A1 | 6/2006 | Bryner et al. | |
| 2006/0207932 A1 | 9/2006 | Hajek et al. | |
| 2006/0230731 A1 | 10/2006 | Kalayci et al. | |
| 2006/0242933 A1 | 11/2006 | Webb et al. | |
| 2006/0266701 A1 | 11/2006 | Dickerson et al. | |
| 2007/0039300 A1 | 2/2007 | Kahlbaugh et al. | |
| 2007/0227359 A1 | 10/2007 | Choi | |
| 2008/0073296 A1* | 3/2008 | Dema et al. | 210/767 |
| 2009/0044702 A1 | 2/2009 | Adamek et al. | |
| 2009/0050578 A1 | 2/2009 | Israel et al. | |
| 2009/0266759 A1 | 10/2009 | Green | |

FOREIGN PATENT DOCUMENTS

| | | |
|---|---|---|
| EP | 0 340 763 A1 | 11/1989 |
| EP | 0 451 554 A1 | 10/1991 |
| EP | 0 451 554 B1 | 10/1994 |
| EP | 0 465 203 B1 | 3/1996 |
| EP | 1 036 585 | 9/2000 |
| EP | 1 118 632 B1 | 8/2001 |
| EP | 1 141 454 | 10/2001 |
| EP | 0 844 861 B1 | 3/2002 |
| EP | 1 378 283 | 7/2002 |
| EP | 1 179 673 A3 | 12/2002 |
| EP | 1 171 495 B1 | 3/2003 |
| GB | 1 532 076 | 11/1978 |
| WO | WO 97/41167 | 11/1997 |
| WO | WO 99/47211 | 9/1999 |
| WO | WO 01/03802 A1 | 1/2001 |
| WO | WO 02/45098 A2 | 6/2002 |
| WO | WO 03/080904 A2 | 10/2003 |
| WO | WO 2004/089509 A2 | 10/2004 |
| WO | WO 2005/120678 A1 | 12/2005 |
| WO | WO 2006/052656 A1 | 5/2006 |
| WO | WO 2006/052732 A2 | 5/2006 |
| WO | WO 2006/089063 A2 | 8/2006 |
| WO | WO 2009/088647 A1 | 7/2009 |

OTHER PUBLICATIONS

"Filtration—Daiwabo and Kyowa Jointly Produce Microfiber Filter," *Nonwovens Markets*, vol. 7, No. 4, p. 5 (Feb. 14, 1992).

Hagewood, J., "Bicomponent Filtration: Variable Capacity Continuous Extended Area Filter," *International Fiber Journal*, vol. 14, No. 1, pp. 58-67 (Feb. 1998).

Lennox-Kerr, P., "Advances in Textiles Technology," *International Newsletters Ltd*, UK, vol. 153, 3 pages (Sep. 2003).

"Three-Dimensional Structure Incorporates Heterofil Fibre and Carbon Beads," *Nonwovens Report, International*, No. 295, pp. 8-9 (Oct. 1995).

Zhao, R., "An Investigation of Bicomponent Polypropylene/Poly(ethylene Terephthalate) Melt Blown Microfiber Nonwovens, A Dissertation," Front Cover, pp. i-xix, pp. 1-207, 3 Information Pages (Dec. 2001).

File history for co-pending U.S. Appl. No. 10/982,538, filed Nov. 5, 2004, entitled "High Strength, High Capacity Filter Media and Structure".

"2.2 The Fourdrinier", http://www.paper.org.uk/papertech/data/unit_03/2_mechanical_methods/2-2_fourdrinier...., (Sep. 24, 2007) (7 pages).

Dahiya et al., "Dry-Laid Nonwovens", http://www.engr.utk.edu/mse/pages/Textiles/Dry%20Laid%20Nonwovens.htm, 10 pages (Apr. 2004).

Donaldson Company brochure entitled "Cost Effective Emissions Solutions for Diesel Engines", 4 pages (2004).

Donaldson Company Torit® brochure entitled "HEPA & 95% DOP Panel Filters", 4 pages (2004).

European Search Report, EP 07119967.3, mailed May 6, 2008, 6 pages.

Hinds, Aerosol Technology Properties, Behavior, and Measurement of Airborne Particles, Second Edition, 3 pages (Copyright 1999).

International Search Report mailed Mar. 23, 2006, PCT/US2005/039793 (11 pages).

International Search Report mailed Nov. 21, 2007, PCT/US2007/00963 (14 pages).

International Search Report mailed Aug. 29, 2008, PCT/US2008/054574 (11 pages).

Puurtinen, "Multilayering of Fine Paper With 30Layer Headbox and Roll and Blade Gap Former", Helsinki University of Technology, Laboratory of Paper Technology Reports, Series A19 (May 14, 2004) (54 pages).

File History for co-pending U.S. Appl. No. 10/982,538, filed Nov. 5, 2004, entitled "Filter Media and Structure" (280 pages).

File History for co-pending U.S. Appl. No. 11/381,010, filed May 1, 2006, entitled "Filter Medium and Breather Filter Structure" (141 pages).

File History for co-pending U.S. Appl. No. 12/036,022, filed Feb. 22, 2008, entitled "Formed Filter Element" (145 pages).

File History for co-pending U.S. Appl. No. 12/035,150, filed Feb. 21, 2008, entitled "Filter Element and Method" (220 pages).

File History for co-pending U.S. Appl. No. 12/694,913, filed Jan. 27, 2010, entitled "Fibrous Media" (141 pages).

File History for co-pending U.S. Appl. No. 12/694,935, filed Jan. 27, 2010, entitled "Methods and Apparatus for Forming a Fibrous Media" (138 pages).

* cited by examiner

HIGH STRENGTH, HIGH CAPACITY FILTER MEDIA AND STRUCTURE

CROSS REFERENCE TO RELATED APPLICATION

This application is a divisional of application Ser. No. 10/982,538, filed Nov. 5, 2004, which application is incorporated herein by reference.

FIELD OF THE INVENTION

The invention relates to a filtration medium and a filter using the medium. The medium has high strength, efficiency and high capacity for filtration of particulate from a stream. The filter medium or media comprise a non-woven web suitable for removal of particulate from mobile fluids such as aqueous streams and non-aqueous streams including fuels, lubricating oils and hydraulic fluids. The invention relates to non-woven media layers obtaining sufficient wet strength, particulate efficiency, permeability and other properties to survive the common operating conditions, such as variation in flow rate, temperature, pressure and particulate loading while removing substantial particulate loads from the liquid stream. The invention further relates to filter structures comprising one or more layers of the particulate removing media with other layers of similar or dissimilar media. These layers can be supported on a porous or perforate support and can provide mechanical stability during filtering operations. Lastly, the invention relates to a method of filtering both aqueous and non-aqueous fluids.

BACKGROUND OF THE INVENTION

Non-woven webs have been manufactured for many years for many end uses, including filtration media. Such structures made from bicomponent or sheath-core materials are disclosed in, for example, Wincklhofer et al., U.S. Pat. No. 3,616,160; Sanders, U.S. Pat. No. 3,639,195; Perrotta, U.S. Pat. No. 4,210,540; Gessner, U.S. Pat. No. 5,108,827; Nielsen et al., U.S. Pat. No. 5,167,764; Nielsen et al., U.S. Pat. No. 5,167,765; Powers et al., U.S. Pat. No. 5,580,459; Berger, U.S. Pat. No. 5,620,641; Berger, U.S. Pat. No. 6,174,603; Hollingsworth et al., U.S. Pat. No. 6,146,436; Dong, U.S. Pat. No. 6,251,224; Sovari et al., U.S. Pat. No. 6,355,079; Hunter, U.S. Pat. No. 6,419,721; Cox et al., U.S. Pat. No. 6,419,839; Stokes et al., U.S. Pat. No. 6,528,439; Amsler, U.S. Pat. No. H2,086 and Amsler, U.S. Pat. No. 6,267,252. Such structures have been made by both air laid and wet laid processing and have been used in both air and liquid filtration applications with some degree of success. In this regard we have found that the previous non-woven webs that are used for particulate removal from mobile fluids often suffer from a lack of mechanical strength and short useful life when wet by liquid under filtration condition. Often the pressure of the fluid exceeds the wet burst strength of the media. The media can also become rapidly plugged and reduced in permeability causing reduced flow or failure of fluid movement. Burst or plugged media rapidly fail to filter particulate. A burst media would fail to protect the equipment from particulate it was designed to protect. Substantially increased or high pressure drop would restrict the fluid flow resulting in loss of fluid flow and power.

Many attempts to obtain non-woven structures with suitable perforate or porous supports have been attempted. Melt blown materials and thermal lamination techniques have been attempted, however, the resulting structures often obtain incorrect pore sizes, reduced efficiency, reduced permeability, lack of strength or other problems rendering the media or filter structure insufficient for useful filtration applications.

A substantial need exists for filtration media, filter structures and filtration methods that can be used for removing particulate materials from liquid compositions, such as aqueous liquids and in particular, non-aqueous liquids such as fuels, lubricating oils and hydraulic fluids. The invention provides such media, filtration structures and methods and provides a unique media or media layer combinations that achieve substantial permeability, high wet strength, substantial efficiency and long filtration life.

BRIEF DESCRIPTION OF THE INVENTION

We have found a filter media and a unique filter structure capable of removing particulate from liquid streams. The media comprises a thermally bonded sheet made by combining a substantial proportion of an inorganic glass fiber, a fiber blend of differing fiber diameters, and a bicomponent thermoplastic binder fiber. Such a medium can be made with optimal secondary fibers and other additive materials. These components combine to form a filter medium or non-woven material having substantial flow capacity, permeability and high strength. The media of the invention can maintain intact filtration capacity at high pressure for a substantial period of time. The media and filter operate at substantial flow rate, high capacity and substantial efficiency.

A first aspect of the invention comprises a filtration media or medium having a thermally bonded non-woven structure.

A second aspect of the invention comprises a bilayer filtration medium or media comprising at least one loading layer and at least one efficiency layer with the mobile fluid passing first through the loading layer.

A third aspect of the invention comprises a filter structure comprising a filtration media of the invention, a loading layer filtration media of the invention, an efficiency layer filtration media of the invention or combinations thereof also combined with other filtration layers, support structures and other filter components.

A fourth aspect of the invention comprises a depth loading layer that can be used as a stand alone layer or as a combination with an efficiency layer. The depth layer can be responsible for a large part of the high performance character of this media, where the depth loading media that does not compress or tear when subjected to application conditions.

Lastly, a fifth aspect of the invention comprises a method of filtering the mobile liquid phase having a particulate load using the filtration aspects of the invention.

In general, the technology can be applied to filtering liquid systems. In liquid filtering techniques, the collection mechanism is believed to be sieving. In a single layer the efficiency is that of the layer. The composite efficiency in a liquid application is limited by the efficiency of the single layer with the highest efficiency. The liquids would be directed through the media according to the invention, with particulates therein trapped in a sieving mechanism. In liquid filter systems, i.e. wherein the particulate material to be filtered is carried in a liquid, such applications include aqueous and non-aqueous and mixed aqueous/non-aqueous applications such as water streams, lube oil, hydraulic fluid, fuel filter systems or mist collectors. Aqueous streams include natural and man-made streams such as effluents, cooling water, process water, etc. Non-aqueous streams include gasoline, diesel fuel, petroleum and synthetic lubricants, hydraulic fluid, brake fluid and other ester based working fluids, cutting oils, food grade oil, etc. Mixed streams include dispersions comprising water in oil and oil in water compositions and aerosols comprising water and a non-aqueous component.

A substantial proportion of glass fiber is used in the manufacture of the media of the invention. The glass fiber provides pore size control and cooperates with the other fibers in the media to obtain a media of substantial flow rate, high capacity and substantial efficiency. The term glass fiber "source" means a glass fiber composition characterized by an average diameter and aspect ratio that is made available as a distinct raw material. Blends of fiber obtained from such sources that vary in diameter do not read on single source.

Other fibers called "secondary fibers" can also be used in the manufacture of the media layer of the invention. Secondary fibers are single component fibers that add some aspect of layer formation or filter property to the medium. Such secondary fibers can add to the filtration properties of the invention, but it can also act as "binder fibers" in binding the fibrous mat into a useful media web. These fibers can add to the filtration characteristic of the media or can add to the binder characteristic of the bicomponent fiber. The term "secondary fibers" can include a variety of different fibers from natural synthetic or specialty sources. Secondary fibers are typically monocomponent fibers with a diameter that can range from about 0.1 to about 100 micrometers and can be made from a variety of materials including naturally occurring cotton linters wool, various cellulosic and proteinaceous natural fibers, synthetic fibers including rayon, acrylic, aramide, nylon (including nylon 6, nylon 6,6, nylon 6,12, etc.), polyolefin (including polyethylene's, polypropylenes), polyester fibers (including polyethylene terephthalate, polybutylene terephthalate, PCT, etc). Additionally, the binder fiber can include fibers made from such polymers as polyvinyl chloride, polyvinyl alcohol. Secondary fibers can also include inorganic fibers such as carbon/graphite fiber, metal fiber, ceramic fiber and combinations thereof.

The preferred filter structure of the invention comprises at least one filtration media layer of the invention supported on a mechanically stable perforate support structure. The filtration layer can comprise two media layers, a loading layer and an efficiency layer, of the invention with cooperating functions to achieve excellent particulate removal at high efficiency. While the differences between the loading and efficiency layers can be difficult to separate when made in serial fashion, we believe that the layers have the following general and preferred characteristics.

TABLE 1

General Characteristics

| Description | Weight Lbs/ 3000 ft$^2$ | Perm, Ft-min$^{-1}$ | Thickness Inches | Loading gms/ft$^2$ | $\beta_x =$ 75 μm |
|---|---|---|---|---|---|
| Efficiency layer | 15-50 | 5-50 | 0.01-0.02 | 12 | 9 |
| Loading layer | 25-50 | 40-200 | 0.015-0.025 | 23 | 12 |
| Laminated composite | 50-150 | 5-50 | 0.04-0.05 | 17 | 9 |
| Nw loading layer | 25-50 | 50-125 | 0.01-0.02 | — | — |
| New efficiency layer | 50-75 | 10-45 | 0.02-0.04 | 13 | 10 |
| New composite | 50-150 | 10-50 | 0.025-0.055 | 19 | 11 |

TABLE 2

Preferred Characteristics

| Description | Weight Lbs/ 3000 ft$^2$ | Perm, Ft-min$^{-1}$ | Thickness Inches | Loading gms/ft$^2$ | $\beta_x =$ 75 μm |
|---|---|---|---|---|---|
| Efficiency layer | 40-50 | 20-40 | 0.01-0.02 | 12 | 9 |
| Loading layer | 35-45 | 120-140 | 0.015-0.025 | 23 | 12 |
| Laminated composite | 100-125 | 15-35 | 0.04-0.05 | 17 | 9 |
| Nw loading layer | 30-40 | 100-140 | 0.01-0.02 | — | — |
| New efficiency layer | 50-75 | 20-40 | 0.02-0.04 | 13 | 10 |
| New composite | 75-127 | 15-40 | 0.025-0.055 | 19 | 11 |

TABLE 3

Specific Characteristics

| Description | Weight Lbs/ 3000 ft$^2$ | Perm, Ft-min$^{-1}$ | Thickness Inches | Loading gms/ft$^2$ | $\beta_x =$ 75 μm |
|---|---|---|---|---|---|
| Efficiency layer | 42 | 28 | 0.018 | 12 | 9 |
| Loading layer | 40 | 135 | 0.022 | 23 | 12 |
| Laminated composite | 110 | 21 | 0.045-0.050 | 17 | 9 |
| Nw loading layer | 35 | 115 | 0.015-0.020 | — | — |
| New efficiency layer | 65 | 30 | 0.03 | 13 | 10 |
| New composite | 100 | 22 | 0.05 | 19 | 11 |

The perforate structure supports the media under the influence of fluid under pressure passing through the media. The filter structure of the invention can also be combined with additional layers of the perforate support, high permeability mechanically stable scrim and additional filtration layers such as a loading layer. This multilayer media commonly is housed in a filter cartridge commonly used in the filtration of non-aqueous liquids.

"Bicomponent fiber" means a thermoplastic material having at least one fiber portion with a melting point and a second thermoplastic portion with a lower melting point. The physical configuration of these fibers is typically in a "side-by-side" or "Sheath-core" structure. In side-by-side structure, the two resins are typically extruded in a connected form in a side-by-side structure. In the sheath-core structure, the low melting point (about 100 to 120° C. thermoplastic is typically extruded around a fiber of the higher melting typically over 240° C.) point material. The lower melting polymer acting as a thermoplastic binding agent, the melt polymer adhering the component and the higher melting thermoplastic acting as a structural material. In use, the bicomponent fibers typically have a fiber size or diameter of about 10 to 20 micrometers and are typically in a fiber form having a length of about 6 to about 12 mm, preferably about 6 mm. The cross-sectional structure of such fibers can be, as discussed above, the "side-by-side" or "Sheath-core" structure or other structures that provide the same thermal bonding function. The value of the bicomponent fiber is that the relatively low molecular weight resin can melt under sheet forming conditions to act to bind the bicomponent fiber, and other fibers present in the sheet making material into a mechanically stable sheet. Typically, the polymers of the bicomponent (Sheath-core and side-by-side) fibers are made up of different thermoplastic materials, such as for example, polyolefin/polyester (Sheath-core) bicomponent fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like. Particularly preferred in the present invention is a bicomponent fiber known as 271P available from DuPont. Other fibers include FIT 201, Kuraray N720 and the Nichimen 4080. All of these demonstrate the characteristics of cross-linking the sheath poly upon completion of first melt. This is important for liquid applications where the application temperature is typically above the sheath melt temperature. If the sheath does not fully crystallize then the sheath polymer will remelt in application and coat or damage downstream equipment and components.

"Glass fiber" is fiber made using glass of various types. The glass fibers used in papers of the present invention include glass types known by the designations: A, C, D, E, Zero Boron E, ECR, AR, R, S, S-2, N, and the like, and generally, any glass that can be made into fibers either by drawing processes used for making reinforcement fibers or spinning processes used for making thermal insulation fibers. Such fiber is typically used as a collection of fiber of diameter about 0.1 to 10 micrometers and an aspect ratio (length divided by diameter) of about 10 to 10,000.

We have found that by blending various proportions that substantially improved permeability can be obtained by blending various fiber diameters. Typically, glass fibers produced in a product having a fiber diameter within a certain range of variation. We have found that blending various (average fiber diameter) sizes of fibers, about 0.1 to about 1 micron, about 0.3 to 2, about 0.5 to 3 about 0.75 to 5 or about 3 to 10 micrometers, can result in high permeability and excellent flow. The term blend in this context means that the medium contains at least some of at least two different fiber sources of differing dimensions typically different diameters.

Some amount of a resinous binder component is necessary to obtain adequate strength for the non-woven media of this invention. Resin used as binder can be in the form of water soluble or dispersible polymer added directly to the paper making dispersion or in the form of thermoplastic binder fibers of the resin material intermingled with the aramide and glass fibers to be activated as a binder by heat applied after the non-woven is formed. Dispersing the fibers and then adding the binder material or dispersing the binder material and then adding the fibers comprise two processes for dispersion formation. Combining a dispersion of fibers with a dispersion of the binder material can also, make the dispersion. The concentration of fibers in the dispersion can range from 0.01 to 1 weight percent based on the total weight of the dispersion. The concentration of binder material in the dispersion can range from 5 to 50 weight percent based on the weight of the fibers; and, if the binder material is fibrids, the concentration can range from 15 to 35 weight percent based on the total weight of the paper.

Wet laid or dry laid processes can be used. In making the media of the invention, a fiber mat is formed using either wet or dry processing. The mat is heated to form the media by internally adhering the fibers. The bicomponent fiber used in the media of the invention permits the fiber to fuse into a mechanically stable mass. The bicomponent fiber having a thermally bonding exterior sheath causes the bicomponent fiber to bind with other fibers in the media layer. The bicomponent fiber cooperates with the aqueous resin and other fibers to form the medium.

Such a medium typically comprises a thin layer with substantial filtration properties. In many applications, especially those involving relatively high flow rates, an alternative type of filter media, sometimes generally referred to as "depth" media, can be used. A typical depth media comprises a relatively thicker tangle of fibrous material than standard media. Depth media is generally defined in terms of its porosity, density or percent solids content. For example, a 2-3% solidity media would be a depth media mat of fibers arranged such that approximately 2-3% of the overall volume comprises fibrous materials (solids), the remainder being air or gas space. Another useful parameter for defining depth media is fiber diameter. If percent solidity is held constant, but fiber diameter (size) is reduced, pore size is reduced; i.e. the filter becomes more efficient and will more effectively trap smaller particles. A typical conventional depth media filter is a deep, relatively constant (or uniform) density, media, i.e. a system in which the solidity of the depth media remains substantially constant throughout its thickness. By "substantially constant" in this context, it is meant that only relatively minor fluctuations in density, if any, are found throughout the depth of the media. Such fluctuations, for example, may result from a slight compression of an outer engaged surface, by a container in which the filter media is positioned. In general, a depth media arrangement can be designed to provide "loading" of particulate materials substantially throughout its volume or depth. Thus, such arrangements can be designed to load with a higher amount of particulate material, relative to surface-loaded systems, when full filter lifetime is reached. However, in general the tradeoff for such arrangements has been efficiency, since, for substantial loading, a relatively low solids media is desired. Gradient density systems such as those in the patents referred to above have been designed to provide for substantial efficiency and longer life. In some instances, surface-loading media is utilized as a "polish" filter in such arrangements. In the preferred wet laid processing, the medium is made from an aqueous furnish comprising a dispersion of fibrous material in aqueous medium. The aqueous liquid of the dispersion is generally water, but may include various other materials such as pH adjusting materials, surfactants, defoamers, or other processing aids and the like. The aqueous liquid is usually drained from the dispersion by conducting the dispersion onto a screen or other perforated support retaining the dispersed solids and passing the liquid to yield a wet paper composition. The wet composition, once formed on the support, is usually further dewatered by vacuum or other pressure forces and further dried by evaporating the remaining liquid.

The media of this invention can be made on equipment of any scale from laboratory screens to commercial-sized paper-making machinery such as Fourdrinier, inclined wire, and cylinder wire machines, and combinations of them. The general process involves making a dispersion of fibers, glass fibers, and binder material in an aqueous liquid, draining the liquid from the dispersion to yield a wet composition, and heating the wet composition to both dry and thermally bond the fiber into a layer to form the useful medium. This can be done in one step or a series of steps.

DETAILED DESCRIPTION OF THE INVENTION

The medium or media of the invention relates to a composite, non-woven, air laid or wet laid material having formability, stiffness and rigidity, and mechanical stability for filtration properties; high particulate loading capability, low pressure drop during use and a pore size and efficiency suitable for use in filtering fluids. Preferably, the filtration media of the invention is typically wet laid and is made up of randomly oriented array of media fiber and bicomponent fiber that are bonded together using the bicomponent binder fiber and the binder resin of the invention. Heat is used to activate the thermoplastic binding agents in the binder fiber and the resin. The media that can be used in the filters and methods of the invention contain a media fiber, a bicomponent binder fiber, a binder and other components. The medium or media can be formed into substantially planar sheets or formed into a variety of geometric shapes using forms to hold the wet composition during thermal bonding. The media fiber of the invention includes glass, metal, silica and other related fibers. The preferred fiber for use in the invention is a glass fiber having an aspect ratio of 10 to 10,000 and a diameter that can range from about 0.1 to about 10 micrometers in diameter while preferred materials are blends of glass fiber of differing dimensions.

The filter media of the present invention is typically suited for high efficiency filtration properties such that liquids, including aqueous and non-aqueous fuel, lubricant, hydraulic or other such fluids can be rapidly filtered to remove contaminating particulates.

We have found that two filter media of this description can be combined, a loading layer and an efficiency layer, each of said layers having distinct structures and filtration properties to form a composite layer. The layers are distinct structures with different filtration properties that cooperate to obtain filtration performance. In the manufacturing process is formed the efficiency layer first, allowing more of the finer glass fibers to deposit on the efficiency or wire side of the medium. This aids in forming a gradient structure for improved loading performance. The loading layer is then formed on top of the efficiency layer. Preferably before the efficiency layer is completely formed. This allows some intermingling of the fibers between the two layers, forming a gradient structure and enhancing the strength and bond between the layers. When adding the loading layer you also allow the finer fibers to more intermingle with the efficiency layer. When forming the efficiency layer some of the finest fibers are lost through the forming screen or wire. When you form the loading layer, you loose very few of the finest fibers because they are captured and intermingled with the original efficiency layer. The performance, both filtration and physical properties, of sheets formed together vs formed separately and laid on top of each other are different. The efficiency layer is a highly efficient layer having suitable porosity efficiency permeability and other filtration characteristics to remove any remaining harmful particulate from the fluid stream as the fluid passes through the filter structure. The loading filtration media of the invention has a basis weight of about 33 to about 65 g-m$^{-2}$. The efficiency layer has a basis weight of about 65 to about 130 g-m$^{-2}$. The efficiency layer has a mean flow pore size smaller than the loading layer that ranges from about 2 to about 10 micrometers. The loading layer has a permeability that ranges from about 80 to 160 ft-min$^{-1}$. The efficiency layer has a permeability of about 10 to 50 ft-min$^{-1}$. The loading layer or the efficiency layer of the invention has a wet bursting strength of greater than about 5 psi, typically about 10 to about 30 psi. The combined filtration layer has a permeability of about 15 to 40 ft-min$^{-1}$, a wet burst strength of 10 to 30 psi and a basis weight of 130 to 200 g-m$^{-2}$. Microfiber glass is not coated or sized. Only large chopped glass is sized. Both types are used in this application. These commercially available fibers are characteristically coated or sized with a sizing. Such coatings cause the otherwise ionically neutral glass fibers to form and remain in bundles. Manufacturers of glass fibers commonly employ sizes such as this. The sizing composition and cationic antistatic agent eliminates fiber agglomeration and permits a uniform dispersion of the glass fibers upon agitation of the dispersion in the tank. Blends of glass fibers can substantially aid in improving permeability of the materials. We have found that combining two or more sources of glass fiber having an average particle size of about 0.3 to 0.5 micron, glass fiber having an average particle diameter of about 1 to 2 micron, glass fiber having an average particle diameter of about 3 to 6 micrometers or glass fiber with a particle diameter of about 6 to 10 micrometers in varying proportions can substantially improve permeability. We believe such glass fiber blends obtain a controlled pore size resulting in a defined permeability in the media layer.

Binder resins can typically comprise solvent based, water soluble or water sensitive polymer materials. Water based latex as the saturate resin. One could easily use solvent based resins such as phenols and epoxy phenolic blends just as easily. Polymer materials are typically provided in either dry form or aqueous dispersions. Such useful polymer materials include acrylic polymers, ethylene vinyl acetate polymers, ethylene vinyl polyvinyl alcohol, ethylene vinyl alcohol polymers, polyvinyl pyrrolidone polymers, and natural gums and resins useful in aqueous solution. Various combinations of polymers for the bicomponent fiber may be useful in the present invention, but it is important that the first polymer component melt at a temperature lower than the melting temperature of the second polymer component and typically below 300° F. Further, the bicomponent fibers are integrally mixed and evenly dispersed with the pulp fibers. Melting of the first polymer component of the bicomponent fiber is necessary to allow the bicomponent fibers to form a tacky skeletal structure, which upon cooling, captures and binds many of the pulp fibers, as well as binds to other bicomponent fibers. The bicomponent fiber used in the media of this invention generally has a length of 0.1 to 10 millimeters and a diameter of 10 to 20 micrometers.

The preferred materials for the water soluble or dispersible binder polymer are water soluble or water dispersible thermosetting resins such as acrylic resins, methacrylic resins, polyamide resins, epoxy resins, phenolic resins, polyureas, polyurethanes, melamine formaldehyde resins, polyesters and alkyd resins, generally, and specifically, water soluble acrylic resins. methacrylic resins, polyamide resins, that are in common use in the papermaking industry. Such thermoplastic binder resin materials are typically aqueous dispersions of vinyl thermoplastic resins including vinyl acetate materials, vinyl chloride resins, polyvinyl alcohol resins, polyvinyl acetate resins, polyvinyl acetyl resins, acrylic resins, methacrylic resins, polyamide resins, polyethylene vinyl acetate copolymer resins, thermosetting resins such as urea phenol, urea formaldehyde, melamine, epoxy, polyurethane, curable unsaturated polyester resins, polyaromatic resins, resorcinol resins and similar elastomer resins. Such binder resins typically coat the fiber and adhere fiber to fiber in the final non-woven matrix. Sufficient resin is added to the furnish to fully coat the fiber without causing film over the pores formed in the sheet material. The resin can be added to the furnish during papermaking or can be applied to the media after formation.

The latex binder, used to bind together the three-dimensional non-woven fiber web in each non-woven layer or used as the additional adhesive, can be selected from various latex adhesives known in the art. The skilled artisan can select the particular latex adhesive depending upon the type of fibers that are to be bound. The latex adhesive may be applied by known techniques such as spraying, foaming, curtain coating, gravure rolling or size pressing saturation techniques. The amount of solids in the latex adhesive used depends, inter alia, on the weight of the fibers in each layer. Generally, latex adhesives having from 15 to 25% solids are used.

Non-woven media of the invention can contain fibers made from a number of both hydrophilic and hydrophobic fibers. These fibers cooperate with the glass fiber and the bicomponent fiber to form a mechanically stable, but strong, permeable filtration media that can withstand the mechanical stress of the passage of fluid materials and can maintain the loading of particulate during use. The fiber characteristics are typically expressed as denier, typically is considered to indicate the weight in grams of 9000 meters of fiber.

The secondary thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscous rayon, thermoplastic such as polyester, polypropylene, polyethylene, etc., polyvinyl acetate, polylactic acid, and other common fiber types. The thermoplastic fibers are generally fine (about 0.5-20 denier), short (about 0.1-5 cm), staple fibers, possibly containing precompounded conventional additives, such as antioxidant, stabilizers, lubricants, tougheners, etc. In addition, the thermoplastic fibers may be surface treated with a dispersing aid. The preferred thermoplastic fibers are polyamide and polyethylene terephthalate fibers, with the most preferred being polyethylene terephthalate fibers.

The sheet media of the invention are typically made using papermaking processes. The media can be planar or can be made in various geometric forms. Such wet laid processes are particularly useful and many of the fiber components are designed for aqueous dispersion processing. However, the media of the invention can be made by air laid processes that use similar components adapted for aid laid processing. The machines used in wet laid sheet making include hand laid sheet equipment, Fourdrinier papermaking machines, cylindrical papermaking machines, inclined papermaking machines, combination papermaking machines and other machines that can take a properly mixed paper furnish, form a layer of the furnish components, remove the fluid aqueous components to form a wet sheet. A fiber slurry containing the materials are typically mixed to form a uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet or medium. Once sufficiently dried and processed to filtration media, the sheets are typically about 0.01 to 0.1 or 0.02 to 0.08 inch in thickness, having a basis weight of about 30 to 250 $g \cdot m^{-2}$. For a commercial scale process, the bicomponent mats of the invention are generally processed through the use of papermaking-type machines such as commercially available Fourdrinier, wire cylinder, Stevens Former, Roto Former, Inver Former, Venti Former, and inclined Delta Former machines. Preferably, an inclined Delta Former machine is utilized. A bicomponent mat of the invention can be prepared by forming bicomponent fiber and media or glass fiber slurries and combining the slurries in mixing tanks, for example. The amount of water used in the process may vary depending upon the size of the equipment used. The furnish may be passed into a conventional head box where it is dewatered and deposited onto a moving wire screen where it is dewatered by suction or vacuum to form a non-woven bicomponent web. The web can then be coated with a binder by conventional means, e.g., by a flood and extract method or roll coating techniques and passed through a drying oven that dries the mat and cures the binder and thermally bonds the sheet or medium. The resulting mat may be collected in a large roll.

Synthetic especially polyester and glass fiber multi-layer filtration media can be made using both bi-component PET/PET as well as monomer PVA binder fiber and acrylic latex resin. Both efficiency and loading layers are formed nearly simultaneously on a paper machine. Filtration media is suitable for mobile and in-plant hydraulic applications as well as mobile equipment lube oil applications.

EXPERIMENTAL

The Description of the Hand Sheet Making Procedure

Eight experimental 12 inch by 12 inch size hand sheets were made using the furnish recipes in Table 3 using the following procedure.
Procedure:

The materials were selected and weight them into individual containers. For example, to make one batch of 12 inch by 12 inch size hand sheets, 76 grams of select fibers or fibers (depends on the furnish requirements) is used. The fibers were dispersed in known quantity of water, using a blender. If there is insufficient capacity in the blender to disperse all of the fibers in one batch at a time, sub-divide the batch into more manageable parts, with enough sulfuric acid, to reduce pH to about 2.5 to aide dispersion and improve the final formation of the filter media. Combine all parts of fiber dispersion in one container, and then add additional water keeping careful account of quantity of water used to reach a final sheet forming consistency (typically about 0.05%), then stir sufficiently to get uniform dispersion, 15 minutes should be sufficient, before hand sheet formation. This method ensures that a known consistency (fiber weight to water volume of material) is obtained and the materials proportions are equal for each hand sheet. The paper making wire is placed on the screen in the box. The box is closed and water is added. Add 2.5 liters of fiber dispersion to the box with agitation. Drain to form the sheet. Dry sheet, using vacuum to remove excess water allow to air dry or add heat using a print dryer, drum dryer, hot plate or other device. Apply heat above the melt temperature of the sheath polymer of the bi-component fiber.

A resin saturating procedure is used to saturate hand sheets with resin for strength and durability. Place hand sheets on rack in the oven and dried at 300° F. (150° C.) for 10 minutes and then weighed to obtain initial basis weight. Using resin formulation, select resin ingredients and measure all of them into individual containers, then combine them with water. Using a size press laboratory saturating system, adjust the upper roll pressure to 40 psi. Fill saturating pan with the resin solution. Dip handsheet into resin pan and saturate it on both wire and felt side. A support scrim for either wire, felt or both sides may be used in laboratory saturating to prevent sticking and improve handling. Remove the scrim, if used and place wet handsheet on rack in the oven and dry it at 300° F. (150° C.) until dry, and then measure the basis weight. Calculate resin pick up (express as percent) using the formula:

Resin pick up=(Saturated weight−Initial weight)·100/Initial weight

If resin pick up is different than target pickup level adjust resin concentration in steps until target level is achieved. With the right resin pickup level, saturate a batch of handsheets. Remove scrims if used and place wet handsheets on racks allowing them to air overnight. Place dry dried sheets on racks in the oven at 300° F. (150° C.) for 10 minutes, measure weight and calculate the final basis weight and the resin pickup.

TABLE 3-continued

| Furnish Characteristics | |
| --- | --- |
| Secondary polyester fiber | 0 to 55% |
| Loading Layer | |
| Basis Weight of dried layer | 33 to 65 g-m$^{-2}$ |
| Latex resin | Up to 25% |
| PVA binder fiber | 0 to 2% |
| PET/PET sheath core bi-component binder fiber | up to 15% |
| Glass fiber | 70 to 90% |
| Secondary polyester fiber | 0 to 25% |

A second set of single layer hand sheets were prepared using the disclosed procedure for testing. The furnish formulations are found in the following Table 4. The polyvinyl alcohol (PVA) binder resin was used at 1%.

TABLE 4

| | Furnish information | | | |
| --- | --- | --- | --- | --- |
| | Furnish (dry weight %) | | | |
| Glass Fiber (average diameter) | Furnish A (93 g-m$^{-2}$) | Furnish C (93 g-m$^{-2}$) | Furnish D (93 g-m$^{-2}$) | Furnish G (93 g-m$^{-2}$) |
| GLASS FIBER 706 (0.3 micron) | 9% | 9% | 9% | 11% |
| GLASS FIBER 110X (2 micron) | 40% | 40% | 40% | 28% |
| GLASS FIBER 112X (3 micron) | 30% | 30% | 39% | 30% |
| GLASS FIBER Lauscha EC 6-6 SC (6 micron) | 10% | 10% | — | — |
| GLASS FIBER Lauscha EC 10-12 SC (10 micron) | 10% | — | — | — |
| PVA (88% hydrolyzed) SPG 056-11 | 1% | 1% | 1% | 1% |
| BICOMPONENT FIBER (DuPont 271P | — | 10% | 20% | 30% |

TABLE 5

Handsheet Datasheet

| Furnish | Type | Binder Fiber | Target Resin Pickup | Weight, g-m$^{-2}$ | Thickness, inches | Permeability, ft-min$^{-1}$ | Dry Tensile, lbs/(in width) | Wet Tensile, lbs/(in width) | Dry Burst, psi | Loading, gms-ft$^{-2}$ | β @ 10μ | β @ 75μ |
| --- | --- | --- | --- | --- | --- | --- | --- | --- | --- | --- | --- | --- |
| A | base | 0% | 0% | 109 | 0.031 | 27 | 2.2 | 0.9 | 8.6 | 8.5 | 4.15 | 6.98 |
| C | base | 10% | 0% | 101 | 0.030 | 29 | 2.4 | 1.3 | 8.4 | 8.7 | 4.66 | 7.76 |
| D | base | 20% | 0% | 103 | 0.052 | 31 | 1.4 | 0.8 | 8.5 | 10.6 | 5.17 | 8.95 |
| G | base | 30% | 0% | 101 | 0.035 | 32 | 1.6 | 0.8 | 10.3 | 12.8 | 6.15 | 10.76 |
| A | saturated | 0% | 10% | 124 | 0.033 | 23 | 6.5 | 5.7 | 8.5 | 5.3 | 3.75 | 6.41 |
| C | saturated | 10% | 10% | 111 | 0.031 | 28 | 4.1 | 7.4 | 8.3 | 8.8 | 4.57 | 7.54 |
| D | saturated | 20% | 10% | 112 | 0.051 | 29 | 4.2 | 3.1 | 8.3 | 8.6 | 5.34 | 8.80 |
| G | saturated | 30% | 10% | 111 | 0.035 | 31 | 10.9 | 10.6 | 15.2 | 9.9 | 5.93 | 9.77 |

TABLE 3

| Furnish Characteristics | |
| --- | --- |
| Efficiency Layer (% based on dry weight) | |
| Basis Weight of dried layer | 65 to 138 g-m$^{-2}$ |
| Latex resin | Up to 25% |
| PVA binder fiber | 0 to 2% |
| PET/PET sheath core bi-component binder fiber | At least 5% |
| Glass fiber | 50 to 95% |

Table 5 shows that in this experiment that the saturated hand sheets (e.g. Furnish D and G) have comparable permeability, β and loading filtration properties compared to the unsaturated version but have improved wet tensile strength.

Figure 1:
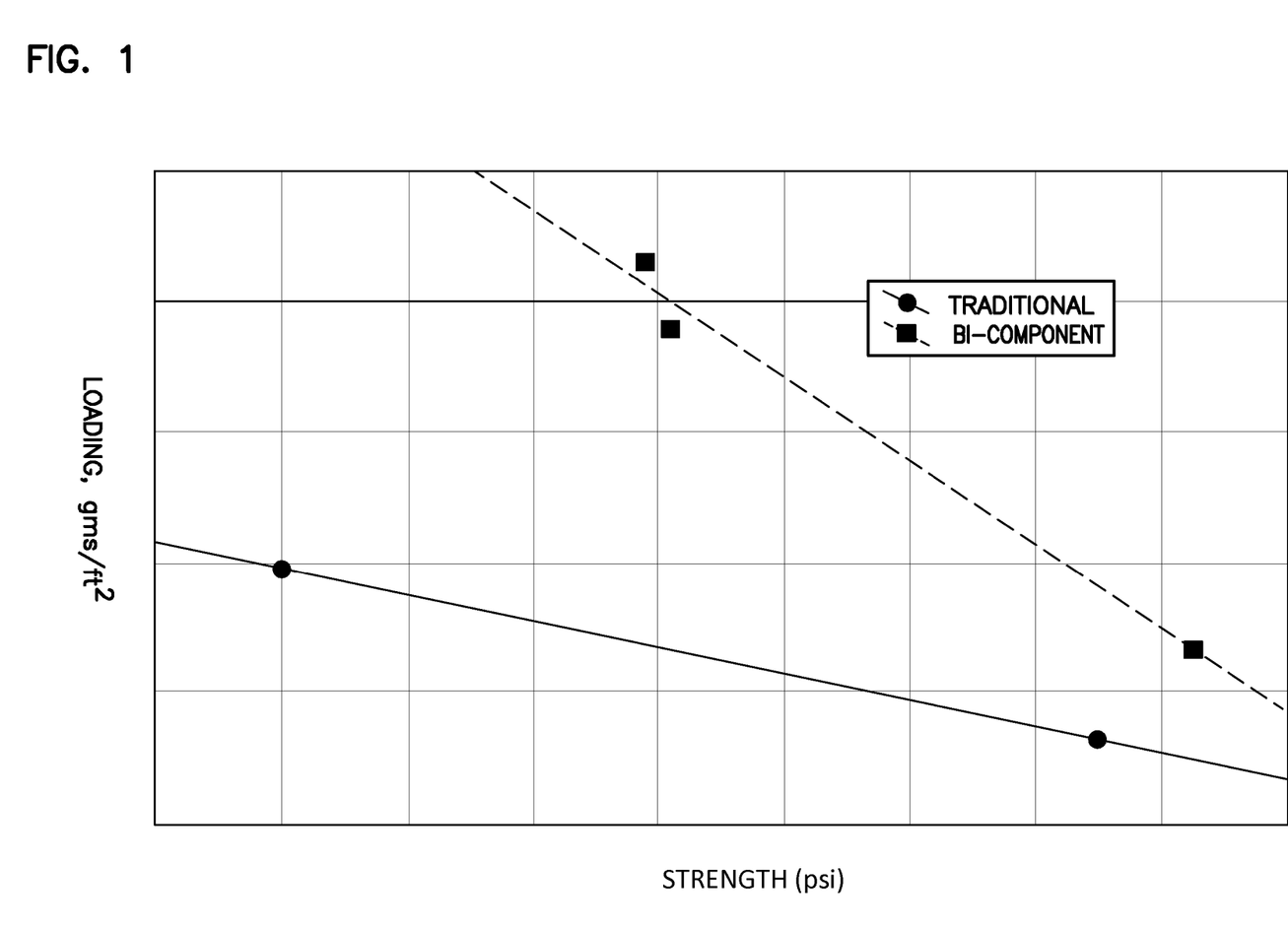
FIG. 1 shows in graphical data our experience in the use of bicomponent fibers in filtration media. The use of bicomponent fiber (all other variables being held constant) provides substantial increase in filtration capacity of the media of the invention, the media maintaining substantial mechanical strength.
Figure 2:
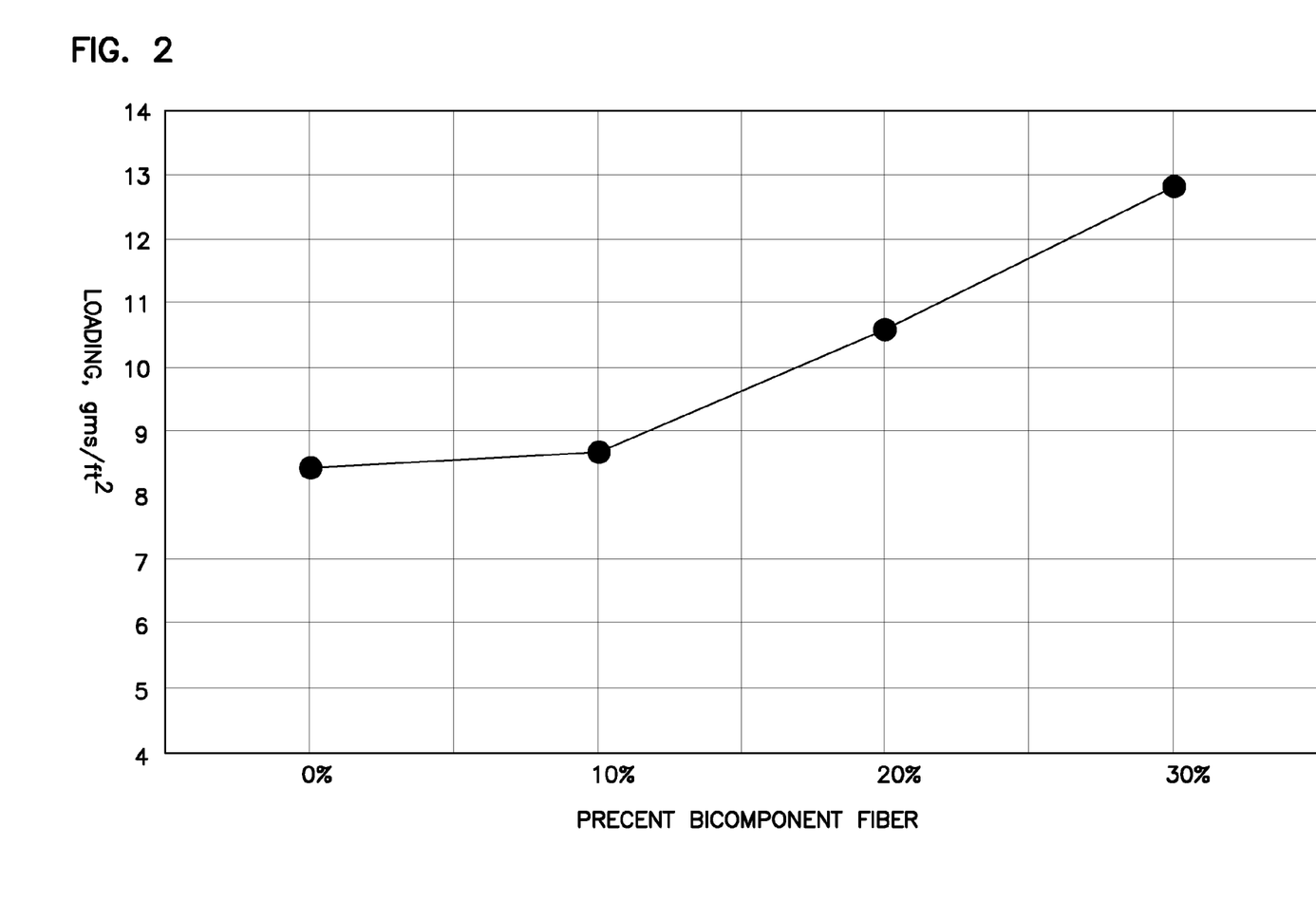
FIG. 2 shows an increase in effective particulate loading resulting from the use of a bicomponent fiber.

FIG. 2 shows that testing conducted on handsheets of Table 5 (flatsheet media samples) using a miniflow Bench according to ISO 16889 test standard. Base results show a 52% increase in loading using 30% bi-component fiber versus the control (0% bi-component).

Figure 3:
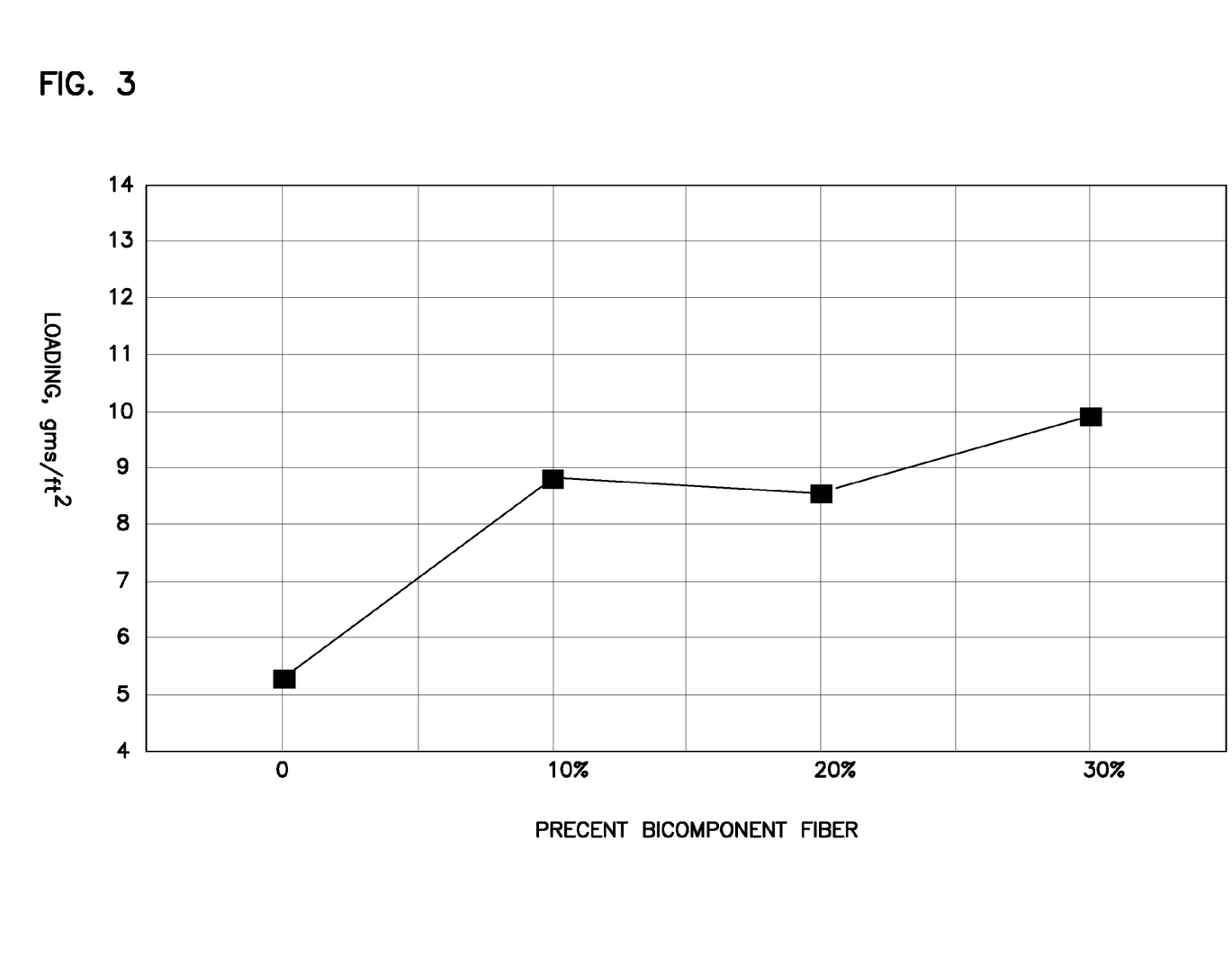
FIG. 3 shows an increase in effective particulate loading resulting from the use of a bicomponent fiber in a resin saturated media.

FIG. 3 shows, in the hand sheets of Table 4, that saturated results provide a 55% increase in loading using 30% bi-component fiber versus the saturated control (0%).

Figure 4:
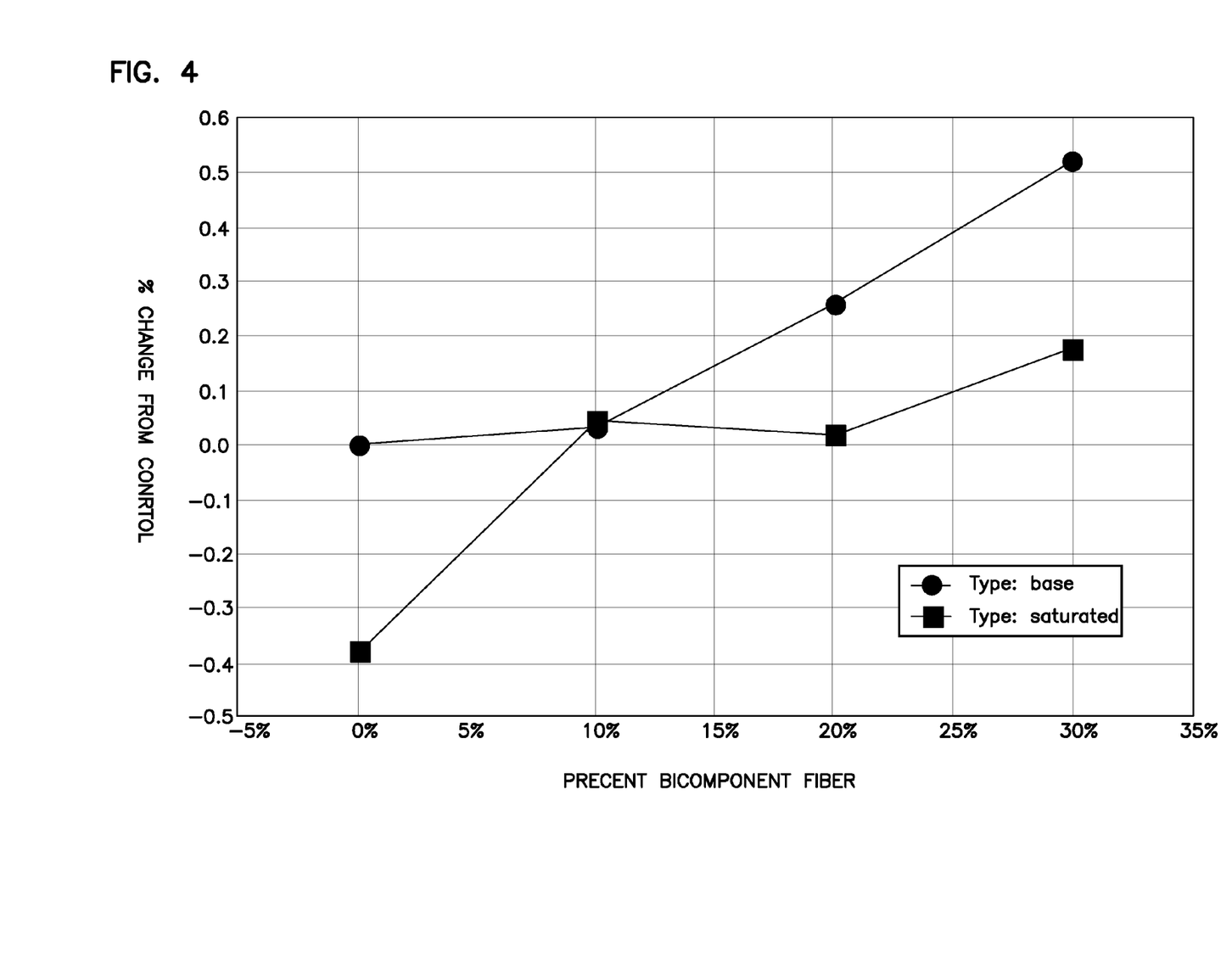
FIG. 4 shows multipass results of similar hand sheets that can be resin saturated or resin free.

FIG. 4 shows both base and saturated handsheet loading data using 0% bi-component with no resin as a control. This also highlights a key benefit of using bi-component fiber; addition of saturate resin detracts from loading performance. If you compare the dry burst strength of the base sheet with 30% bi-component fiber (10.3 psi) to the dry burst strength of the bi-component with and with saturate resin, you will see that much more then 10% resin pick-up is needed to achieve the same strength.

Figure 5:
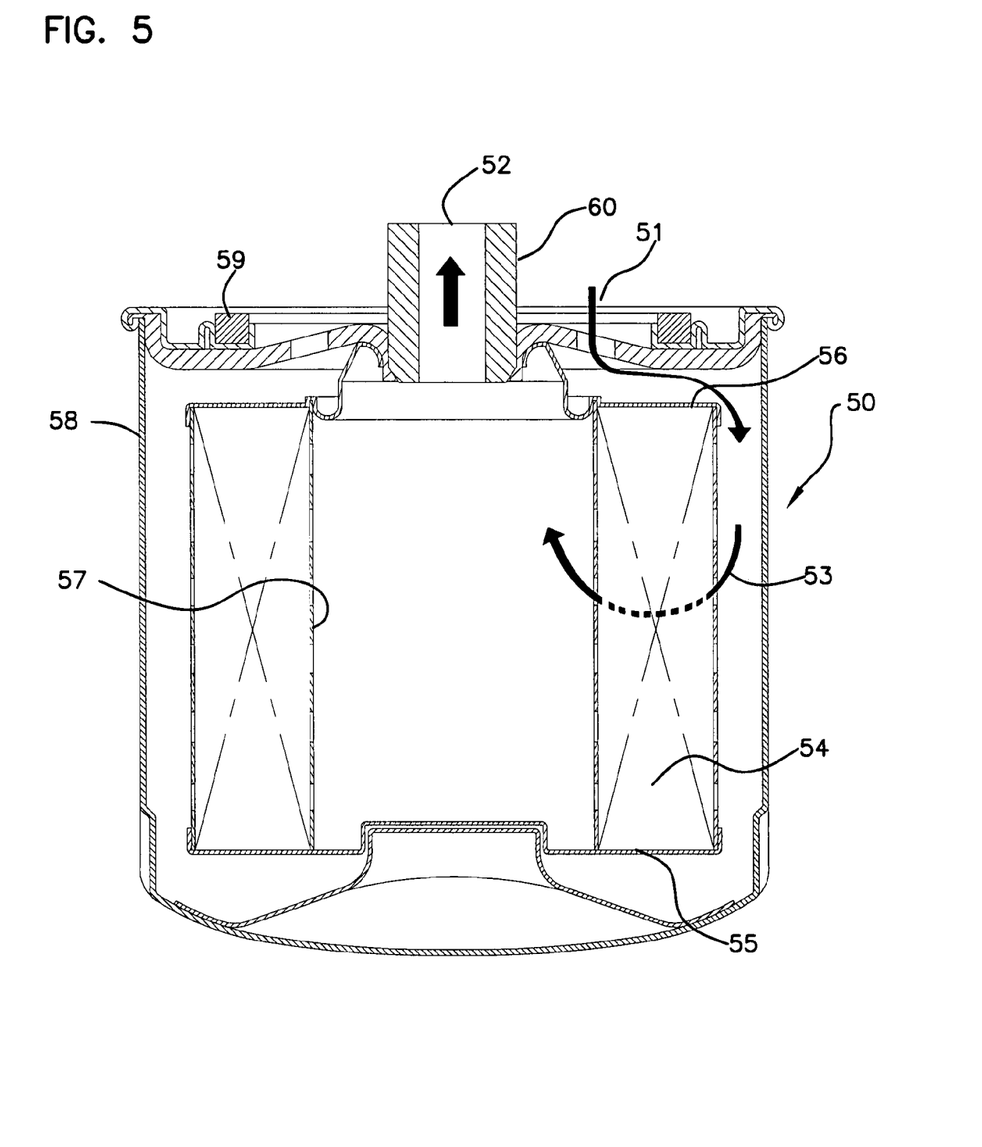
FIG. 5 is a cross section of a spin on cartridge filter aspect of the invention using a pleated media layer for filtering liquids.

FIG. 5 is a cross sectional view of a spin on cartridge filter of the invention. In FIG. 5, cartridge 50 is shown with an exterior shell 58, typically plastic or metallic. At one end of the cartridge structure, is a contact surface end seal 59, a spin on threaded mounting means 60 including an outlet annular space 52. The contact surface has inlet aperture 51 or liquid inlet 51 that permits a liquid having a potential particulate load to enter the cartridge 50. The cartridge contains pleated media 54 sealed at both ends using seal plates 56 and 55 to force the liquid through pleated media 54 using liquid flow path 53. The pleated media material of the invention 54 is typically mechanically insufficient to maintain filtration properties without some form of support. The cartridge 50 of the invention supports pleated media 54 using a support layer 57 which prevents the pleated media from collapsing under the force of the liquid passing through the cartridge.

Figure 6:
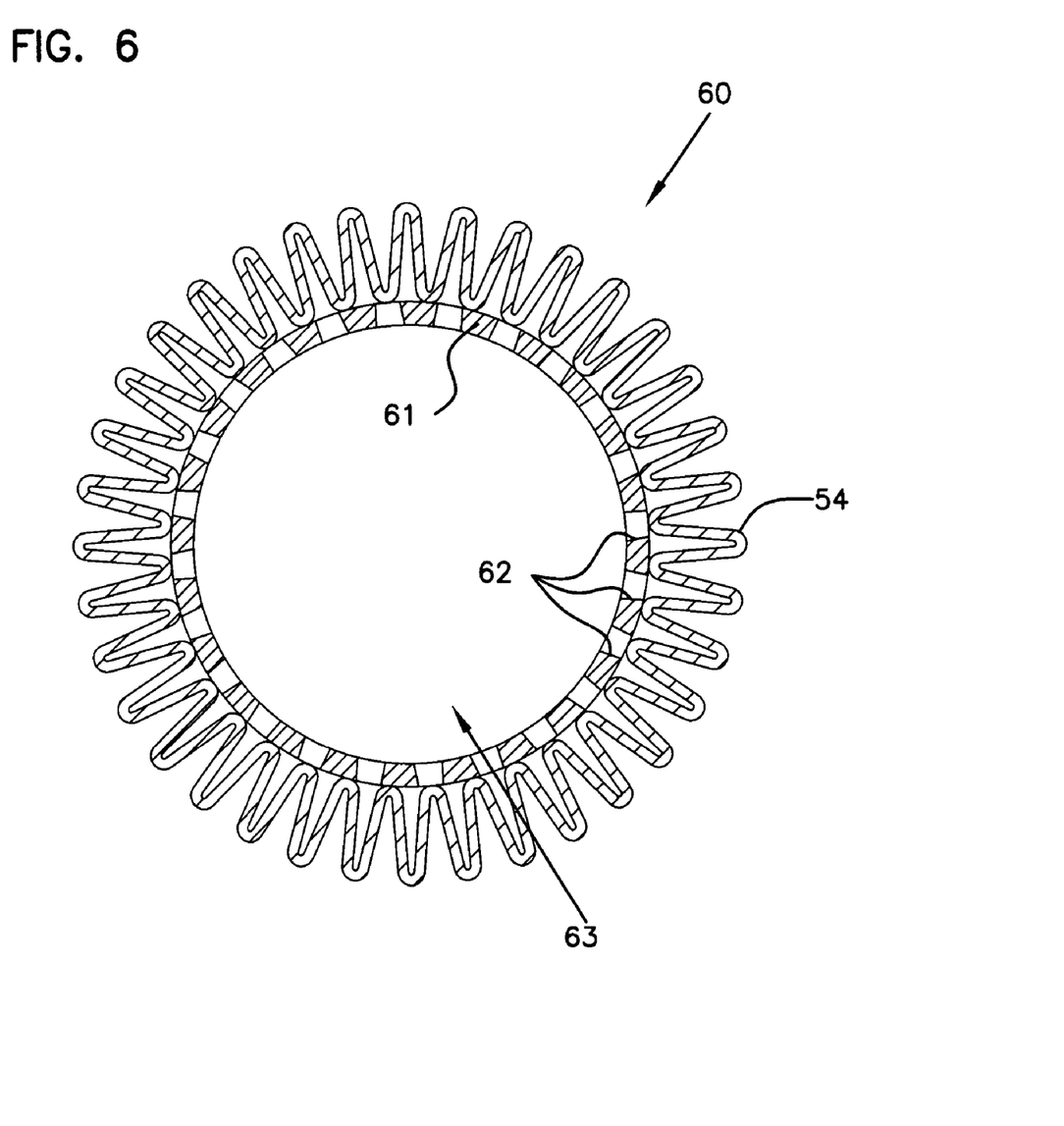
FIG. 6 is a cross sectional top view of the pleated media of the invention supported by a perforate metal support. This combination is one aspect of the supported media of the invention.

FIG. 6 shows one embodiment of a supported pleated media of the invention. In FIG. 6, a pleated media 54 is shown supported on a perforate media support 61. The fluid flow 63 is shown wherein the fluid penetrates the media and the perforate support into the interior of the structure. The perforate media comprises apertures or pores 62 in the support to permit liquid flow from the exterior of the media to the interior of the filter structure. The apertures or pores 62 are surrounded by metal 61 maintaining a mechanically stable support to prevent collapse of the pleated media 54.

Figure 7:
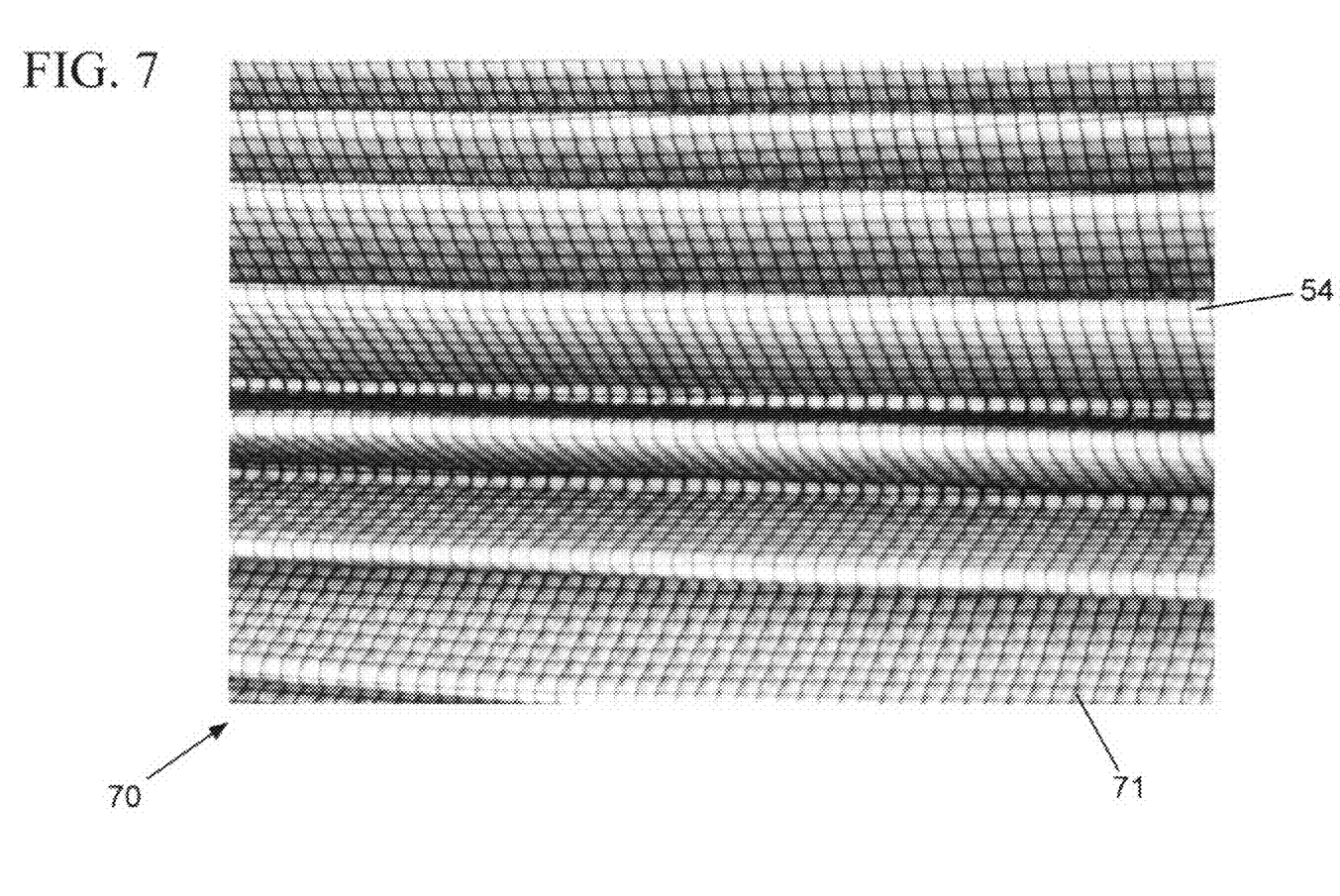
FIG. 7 shows a side view of the down flow side of a pleated media of the invention supported by a screen support.

FIG. 7 is a side view of the down stream side of a screen supported media of the invention. In FIG. 7, supported media 70 is shown wherein pleated media 54 is supported by a screen support 71. Generally to FIG. 6, fluid passes the media side of the supported media through the screen-supported side of the media to the interior of the cartridge structure.

Test method ISO 16889 *"Hydraulic Fluid Power Filters—Multipass Method for Evaluating Filtration of a Filter Element"* was used to obtain the loading and β data. β results are reported per paragraph 12.6 in this test method. β is a filter rating system used by the hydraulic industry. $\beta_x$=(number of particles>stated size upstream of the filter)/(number of particles>stated size downstream of the filter). The "x" subscript indicates the micron size of the particles. For example, if 1,000 particles 15 micrometers and greater were counted upstream of the filter, and 50 of those same size particles were counted downstream, the β would be 20 or $\beta_{15}$=20. Stated another way, the filter is 95% efficient on particles 15 micrometers and larger. Testing conducted on handsheets (flatsheet media samples) using DCI Miniflow Bench according to ISO 16889 test standard. Base results (see FIG. 2) show a 52% increase in loading using 30% bi-component fiber versus the control (0% bi-component).

Permeability relates to the quantity of air ($ft^3$-$min^{-1}$-$ft^{-2}$ or $ft$-$min^{-1}$) that will flow through a filter medium at a pressure drop of 0.5 inches of water. In general, permeability, as the term is used is assessed by the Frazier Permeability Test according to ASTM D737 using a Frazier Permeability Tester available from Frazier Precision Instrument Co. Inc., Gaithersburg, Md. or a TexTest 3300 or TexTest 3310 available from Advanced Testing Instruments Corp (ATI), 243 East Black Stock Rd. Suite 2, Spartanburg, S.C. 29301, (864)989-0566, www.aticoiporation.com. Pore size referred to in this disclosure means mean flow pore diameter determined using a capillary flow porometer instrument like Model APP 1200 AEXSC sold by Porus Materials, Inc., Cornell University Research Park, Bldg. 4.83 Brown Road, Ithaca, N.Y. 14850-1298, 1-800-825-5764, www.pmiapp.com.

Kahlbaugh et al., U.S. Pat. No. 5,082,476, disclose a filter design using a depth media comprising a foam substrate with pleated components combined with the microfiber materials of the invention. Stifelman et al., U.S. Pat. No. 5,104,537, relate to a filter structure useful for filtering liquid media. Liquid is entrained into the filter housing, passes through the exterior of the filter into an interior annular core and then returns to active use in the structure.

Gillingham et al., U.S. Pat. No. 5,820,646, disclose a corrugated or Z filter structure that uses a specific pleated filter design involving plugged passages that require a fluid stream to pass through at least one layer of filter media in a "Z" shaped path to obtain proper filtering performance. The filter media formed into the pleated Z shaped format can contain the fine fiber media of the invention.

While the invention has been described in connection with specific embodiments thereof, the invention is capable of further modifications and this application is intended to cover any variations, uses, or adaptations of the invention following the description of the invention and including known or customary practice within the art to which the invention pertains and as may be applied to the essential features hereinbefore set forth and as follows in scope of the appended claims.

We claim:

1. A method of filtering a non-aqueous liquid comprising a fuel, a lubricant, a hydraulic fluid, or a brake fluid, the method consisting essentially of: passing the non-aqueous liquid with a particulate load through a filter medium comprising a layer comprising 5 to 50 wt % of a bicomponent binder fiber, about 50 to 95 wt % of a glass fiber, and about 0.5 to 25 wt % of a binder resin, the layer having a basis weight of about 30 to 250 g-m$^{-2}$, the layer having a permeability of 10 to 50 ft-min$^{-1}$, a wet bursting strength of about 5 lb-in$^{-2}$ to 30 lb-in$^{-2}$; and removing the particulate load.

2. The method of claim 1 wherein the medium comprises a first layer comprising a loading layer having a basis weight of about 25 to 75 g-m$^{-2}$ and a second layer comprising an efficiency layer having a basis weight of about 50 to 150 g-m$^{-2}$, wherein the loading layer comprises about 1 to 25% of a bicomponent binder fiber and about 70 to 90 w % of a glass fiber, and the efficiency layer comprises about 5 to 25 wt % of a bicomonent binder fiber and about 50 to 95 wt % of a glass fiber.

3. The method of claim 2 wherein the glass fiber comprises a blend of two or more glass fiber sources that differ by average diameter.

4. The method of claim 2 wherein the glass fiber comprises a blend of three or more glass fiber sources that differ by average diameter.

5. The medium of claim 2 wherein the glass fiber comprises a blend of a first fiber having a diameter of less than 0.5 microns and a second glass fiber having diameter of greater than 5 microns.

6. The method of claim 1 wherein the medium comprising a wet bursting strength of about 10 lb-in$^{-2}$ to 30 lb-in$^{-2}$.

7. The method of claim 1 wherein the medium comprises a mean flow pore size of about 2 to about 10 micrometers.

* * * * *